No. 706,404. Patented Aug. 5, 1902.
A. G. W. FOSTER, Sr.
COMBINED SEED PLANTER AND FERTILIZER DISTRIBUTER.
(Application filed May 19, 1902.)
(No Model.) 2 Sheets—Sheet 1.
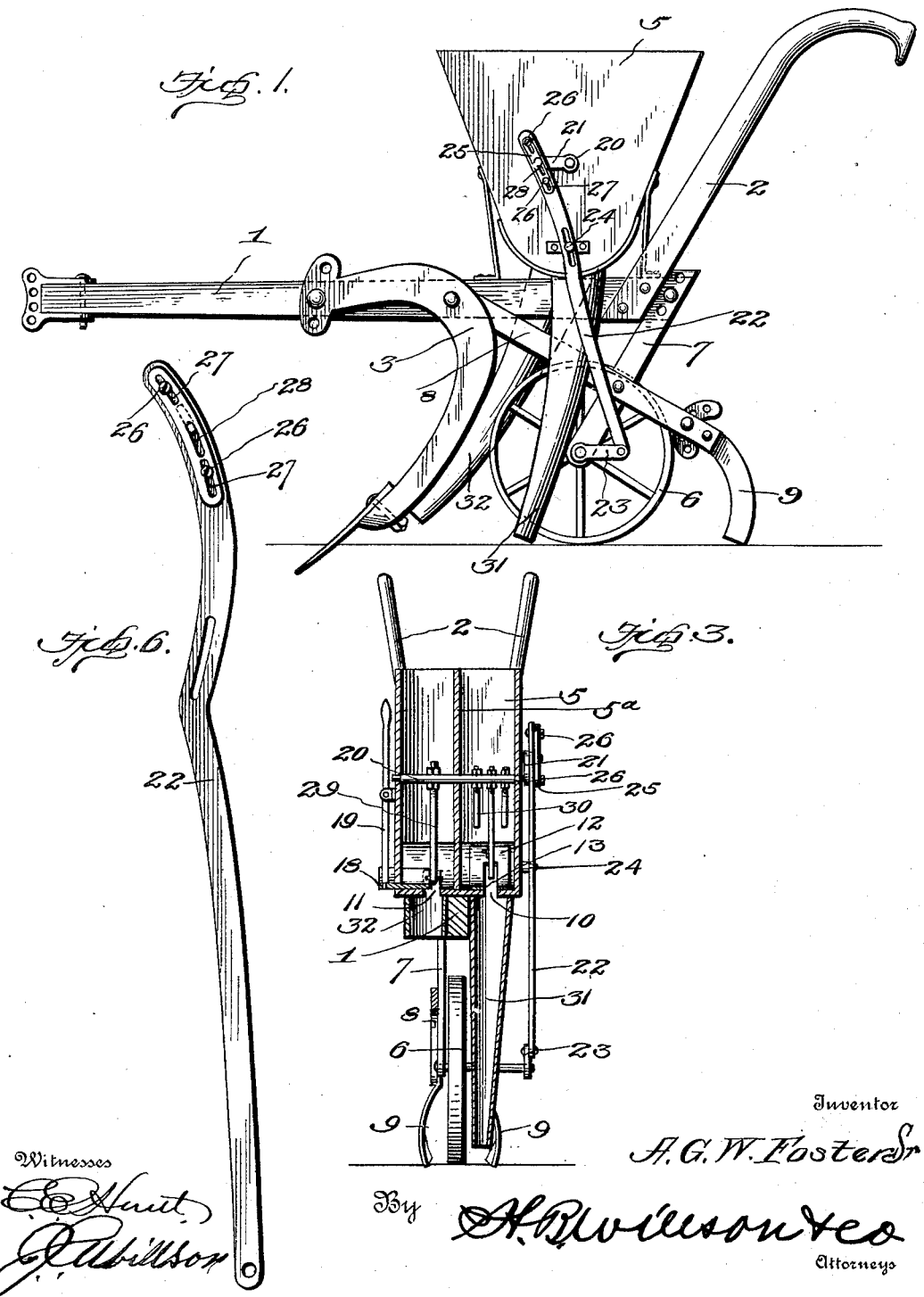
Inventor
A. G. W. Foster Sr.

No. 706,404. Patented Aug. 5, 1902.
A. G. W. FOSTER, Sr.
COMBINED SEED PLANTER AND FERTILIZER DISTRIBUTER.
(Application filed May 19, 1902.)
(No Model.) 2 Sheets—Sheet 2.
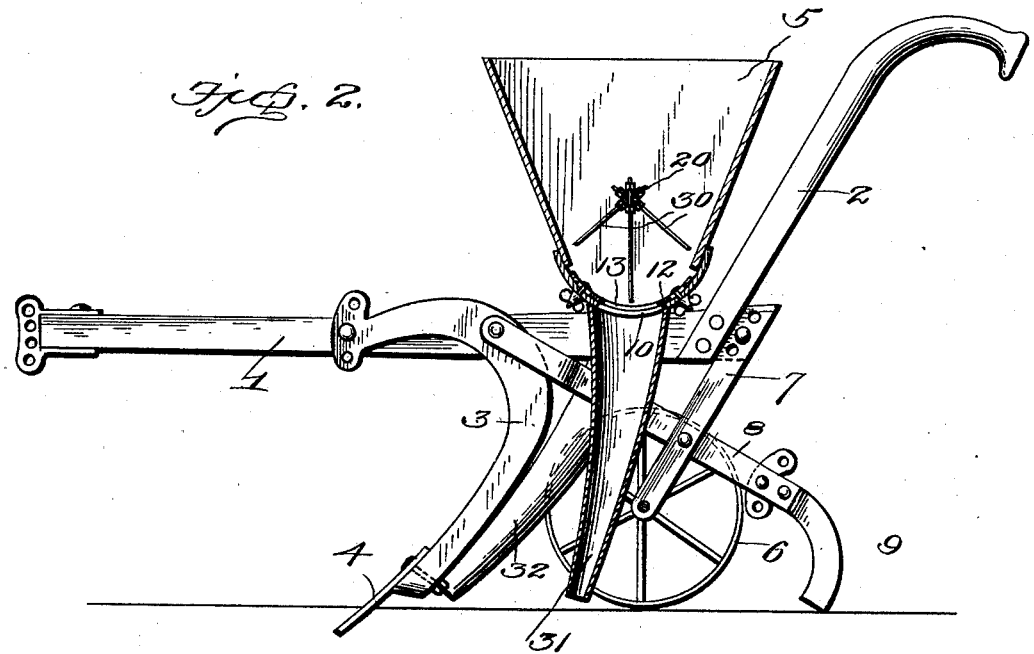
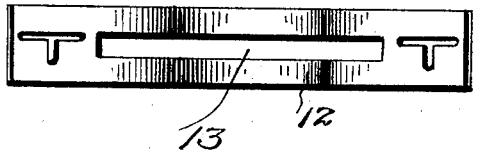
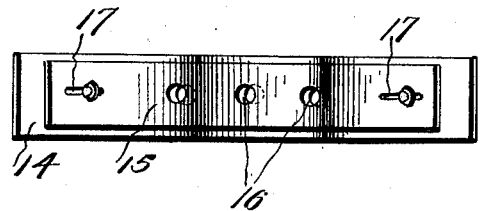

UNITED STATES PATENT OFFICE.

ABRAHAM G. W. FOSTER, SR., OF POWELLVILLE, GEORGIA.

COMBINED SEED-PLANTER AND FERTILIZER-DISTRIBUTER.

SPECIFICATION forming part of Letters Patent No. 706,404, dated August 5, 1902.

Application filed May 19, 1902. Serial No. 108,027. (No model.)

*To all whom it may concern:*

Be it known that I, ABRAHAM G. W. FOSTER, Sr., a citizen of the United States, residing at Powellville, in the county of Coweta and State of Georgia, have invented certain new and useful Improvements in a Combined Seed-Planter and Fertilizer-Distributer; and I do declare the following to be a full, clear, and exact description of the invention, such as will enable others skilled in the art to which it appertains to make and use the same.

The invention relates to combined seed-planters and fertilizer-distributers.

The object of the invention is to provide a machine of this character which can be used as a planter for dropping seed and at the same time distributing fertilizer, or, if desired, can be used for either purpose separately; also, to provide means whereby the hopper-bottom may be changed to plant various kinds of seed.

A further object is to provide a machine of the character described which shall be simple of construction, durable in use, and comparatively inexpensive of production.

With these and other objects in view the invention consists in certain novel features of construction, combination, and arrangement of parts, which will be hereinafter more fully described, and particularly pointed out in the appended claims.

In the accompanying drawings, Figure 1 is a side elevation of the machine. Fig. 2 is a longitudinal vertical section through the seed-hopper. Fig. 3 is a vertical cross-section taken on the line of the agitator-shaft. Fig. 4 is a detail plan view of one form of feed-valve plate. Fig. 5 is a similar view of another form of the same. Fig. 6 is a detail view of the pitman-rod.

In the drawings, 1 denotes the beam of a plow; 2, the handles; 3, the standard, and 4 the shovel. These parts may be of the ordinary well-known construction.

5 denotes a hopper fixed on the rear end of the plow-beam.

6 denotes a ground-wheel suitably journaled in the lower ends of downwardly and forwardly inclined arms 7, the upper ends of which are adjustably connected to the plow-beam.

8 denotes other arms bolted to the beam by the pivot-bolt of the plow-standard and extending downwardly and rearwardly, straddling the wheel 6, and being bolted to the arms 7, thereby securely bracing said arms. To the rear ends of the arms 8 are bolted covering blades or plows 9.

The hopper 5 is divided longitudinally by a partition 5ª, forming two compartments, one of which is used for seed and the other for fertilizer. The bottoms of these compartments are concaved and are formed with longitudinal slots 10 and 11. The bottom of the seed-compartment is adapted to receive valve-plates of varying construction for planting different kinds of seeds.

In Fig. 4 of the drawings I have illustrated the forming-plate used for planting cotton-seed, which consists simply of a thin plate 12, curved to fit the bottom of the hopper, having a longitudinal slot 13 to register with the slot 10 in the hopper-bottom. This plate is also provided near its ends with T-shaped slots, through which bolts that secure it to the hopper-bottom are passed, the bolts being provided on the outside of the hopper-bottom with winged nuts. Thus it will be seen that while the slot 13 in plate 12 normally registers with the slot 10 in the hopper-bottom it may by loosening the winged nuts be moved to lessen the width of the slot 10, and thereby regulate the feed of the cotton-seed.

In Fig. 5 of the drawings I have shown the form of plate used for planting corn, peas, wheat, and other grains. In this case I provide two plates 14 and 15, which are also curved to fit the bottom of the hopper, and these plates are provided centrally with a series of holes 16, which register normally with each other and with the slot 10 in the hopper-bottom. The ends of the upper plate 14 are provided with short slots 17, through which pass set-screws. It is obvious that by loosening said screws and slipping the upper plate a slight distance the size of the holes may be regulated for different grains. These plates are fastened in the bottom of the seed-hopper in place of the cotton-seed plates when desired.

In the bottom of the fertilizer-compartment is mounted to slide a cut-off plate 18, which projects laterally through the side of the hopper and is connected with the lower end of a lever 19, pivoted to the side of the hopper, so that when said lever is operated the plate 18 will be moved in and out across the slot 11 in the bottom of the fertilizer-compartment, by which means it will be seen that the width of the slot may be diminished at will or entirely closed.

20 denotes an agitator-shaft journaled in the sides of the hopper and provided on one side with a crank-arm 21, which is connected by a pitman-rod 22 with a similar crank-arm 23 on the end of the shaft of the ground-wheel 6. The pitman-rod 22 is provided about midway its length with a vertical slot which engages a pin 24, projecting from a lug fixed to the side of the hopper. I also provide the upper end of the pitman-rod with a plate 25, adjustably secured thereto by means of set-screws 26, passing through the elongated openings 27. In this end of the pitman-rod is formed a slot, which registers with a slot 28 in the plate 25, through which slots passes the wrist-pin of the crank-arm 21. By the use of the slotted plate 25 the length of the slot in the pitman may be increased or diminished to regulate the throw of the crank-arm 21 and consequently the oscillatory movement of the agitator-shaft and arm. By removing the pin 24 from the central slot of the pitman the agitator-shaft may be caused to rotate completely instead of oscillating, as formerly.

29 denotes a stirrer or agitator arm adjustably connected to the shaft 20 within the fertilizer-compartment. This arm is provided near its end with laterally-projecting fingers, and its end beyond the fingers is adapted to enter the feed-slot to clear and prevent the same from clogging.

30 denotes agitator-arms adjustably secured to the shaft 20 within the seed-compartment, and these may be three or more in number. If desired, I may construct the central arm of spring metal to force seed through the feed-opening without crushing the same. These arms are reduced and threaded at one end and are adapted to pass through holes in the agitator-shaft and to have screwed thereon a nut above and below the shaft 20, from which construction it will be seen that the arms may be lengthened or shortened at will.

31 denotes a seed-tube connected to the hopper beneath the seed-compartment and extending downwardly beside the ground-wheel to direct the seed into the bottom of the furrow, and 32 denotes a fertilizer-tube connected below the fertilizer-compartment and extending downwardly in position to discharge fertilizer beneath the plow-shovel, as shown.

In operation as the plow is drawn along the shovel opens the furrow, the fertilizer drops in from its tube, then the seed is dropped, and, lastly, the covering-blades draw the soil over the seeds and fertilizer. When wheat is to be drilled in, the covering-blades are removed and the wheat is covered by the soil thrown up from the next furrow.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. In a machine of the character described, the combination of the plow-frame, the combined seed and fertilizer hopper having a concave bottom, the ground-wheel journaled in downwardly-projecting arms adjustably connected to the plow-beam, brace-bars connected to the plow-beam and to said adjustable arms, covering-blades secured to the outer ends of the brace-bars, a discharge-tube connected with the seed-compartment and a discharge-tube connected with the fertilizer-compartment, a feed-opening in the bottom of the fertilizer-compartment, a sliding valve for regulating said feed-opening, means for operating said sliding valve from the outside of the hopper, an adjustable cotton-seed feed-plate and an adjustable grain-seed feed-plate adapted to be interchangeable with each other and adapted to cover a feed-opening in the bottom of the seed-compartment, an agitator-shaft journaled in the sides of the hopper, adjustable agitator-arms carried by said agitator-shaft, a crank-arm fixed to one end of said agitator-shaft, and a crank-arm fixed to the shaft of the ground-wheel, a pitman connecting the said crank-arms whereby motion is imparted from said ground-wheel to said agitator-shaft, substantially as set forth.

2. In a machine of the character described, the combination of the plow-frame, the combined seed and fertilizer hopper having a concave bottom, the ground-wheel journaled in downwardly-projecting arms adjustably connected to the plow-beam, brace-bars connected to the plow-beam and to said adjustable arms, covering-blades adjustably secured to the outer ends of the brace-bars, a discharge-tube connected with the seed-compartment and a discharge-tube connected with the fertilizer-compartment, a feed-opening in the bottom of the fertilizer-compartment, a sliding valve for regulating said feed-opening, a lever pivoted to the side of said hopper and connected at its lower end to said sliding valve to operate the same, an adjustable cotton-seed feed-plate and an adjustable grain-seed feed-plate adapted to be interchangeable with each other and adapted to cover a feed-opening in the bottom of the seed-compartment, an agitator-shaft journaled in the sides of the hopper, adjustable agitator-arms carried by said agitator-shaft, a crank-arm fixed to one end of said agitator-shaft, and a crank-arm fixed to the shaft of the ground-wheel, and an adjustable pitman connecting the said crank-arms whereby variable movements may be imparted to said agitator-shaft, substantially as set forth.

In testimony whereof I have hereunto set my hand in presence of two subscribing witnesses.

ABRAHAM G. W. FOSTER, Sr.

Witnesses:
L. TURNER,
D. P. WOODROOF.